United States Patent [19]

Smith

[11] Patent Number: 4,557,740

[45] Date of Patent: Dec. 10, 1985

[54] WEATHER LOUVER

[75] Inventor: Richard L. Smith, Louisville, Ky.

[73] Assignee: Allis-Chalmers Corporation, Milwaukee, Wis.

[21] Appl. No.: 648,517

[22] Filed: Sep. 10, 1984

[51] Int. Cl.⁴ .............................................. B01D 45/00
[52] U.S. Cl. ...................................................... 55/440
[58] Field of Search ...................... 55/440; 98/121 R; D23/163; 210/521

[56] References Cited

U.S. PATENT DOCUMENTS

| | | | |
|---|---|---|---|
| D. 263,738 | 4/1982 | Sixsmith | 55/440 |
| 1,896,656 | 2/1933 | Anderson | 55/440 |
| 3,870,488 | 3/1975 | Arndt et al. | 55/440 |
| 3,953,183 | 4/1976 | Regehr | 55/440 |
| 3,977,977 | 8/1976 | Kall | 55/440 |
| 4,141,706 | 2/1979 | Regehr | 55/440 |
| 4,430,101 | 2/1984 | Sixsmith | 55/440 |

*Primary Examiner*—Bernard Nozick
*Attorney, Agent, or Firm*—Donald C. McGaughey

[57] ABSTRACT

A weather louver for separating particles from a gaseous medium and primarily to separate mist and droplets of moisture from an air stream. This device includes parallel passages with moisture traps and collectors having drainage troughs to separate the moisture from the air.

3 Claims, 6 Drawing Figures

U.S. Patent     Dec. 10, 1985     4,557,740
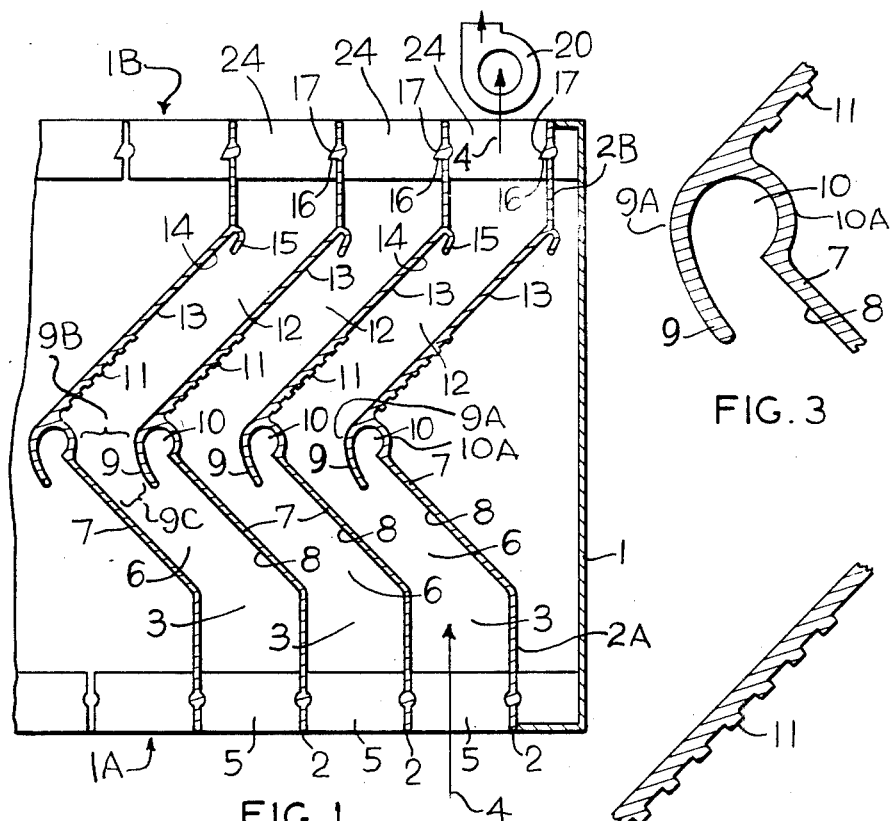
FIG. 1
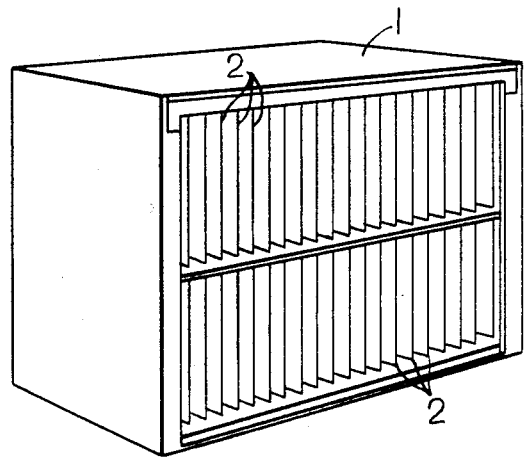
FIG. 2
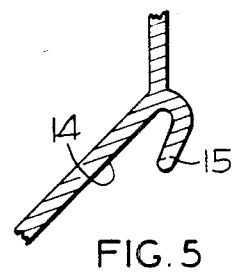
FIG. 3
FIG. 4
FIG. 5
FIG. 6

WEATHER LOUVER

This invention relates to a weather louver and more particularly to a moisture separator and collector for mist, liquid particles and droplets of moisture carried in an air stream. The device includes parallel zigzag passages with moisture traps and drain troughs for collecting the moisture and draining the moisture from the air stream as it passes through the weather louver.

The removal of solid and liquid particles from a gas stream can be accomplished in a variety of ways, the choice being based on which is the most economical and practical depending on the velocity of the air stream and also the volume of air displaced through the weather louver. The size and nature of the particles, which may include dust particles as well as liquid particles and droplets, also affect the choice of the manner in which the separation is accomplished.

The inertia type of separator uses baffle chambers as distinguished from a cyclone chamber in which the gases are rotated at a fairly high speed. The inertia separation principle causes the air stream to change direction rapidly several times as it passes through the separator. The rapid change of direction of the air stream causes particles and droplets because of inertia to leave the air stream and be precipitated out on the surface of a baffle and a chamber allows moisture to drain from the separator. The pockets or chambers formed by the baffles serve to collect the dust particles and moisture droplets as air passes through the passages to the outlet of the separator.

The Regehr patent, U.S. Pat. No. 3,953,183 shows an apparatus for separating particulates from gases. The passages for the air stream are continuous sinusoidal passages having a blade extending into the air stream and a cavity formed beneath it precipitating moisture. A serrated surface above the blade also causes precipitation of moisture on the serrated surface which forms troughs to carry the moisture externally of the device.

The applicant's invention provides bends in linear passages, an impact surface and a double venturi strategically located relative to the impact surface for increasing the velocity of the air as it passes through the passages. The liquid particles impinge on the impact surface as the air makes a right angle turn. The high velocity of the air stream as it passes by the impact surface causes precipitation of the particles on the impact surface from where they are drained from the weather louver.

It is the object of this invention to provide a weather louver for separating and collecting liquid particles carried in the air stream.

It is another object of this invention to provide for separation of liquid and solid particles entrained in an air stream through inertia separation.

It is a further object of this invention to provide a weather louver for separating and collecting entrained liquid particles in an air stream by inertia separation.

The objects of this invention are accomplished in a weather louver assembly including a plurality of parallel passages. The passages zigzag through the weather louver in a generally longitudinal direction. The abrupt changes in the direction of the air causes the liquid particles to precipitate out on impact surfaces whereby the collected moisture can drain from the weather louver. The passage walls include arcuate parts and a deflector forming first and second venturi to vary the size of the passage to accelerate or decelerate the velocity of the air stream at a portion of the air stream passage where the direction of the air stream is changed to cause the liquid droplets to precipitate and drain from the weather louver assembly. The passages preferably linear with sharp bends to form impact surfaces for drainage of the precipitated moisture.

Referring to the drawings, the preferred embodiments of this invention are illustrated.

FIG. 1 illustrates a cross-section view of the passages showing the direction of the air flow through the weather louver;

FIG. 2 illustrates a three-dimensional view of the housing enclosing the weather louver assembly;

FIG. 3 is an enlarged section view of a deflector in the air passage shown in FIG. 1;

FIG. 4 is an enlarged view of a corrugated impact surface downstream from the deflector shown in FIG. 3;

FIG. 5 is an enlarged cross-section view of a vane in the passage downstream of the corrugated surface as shown in FIG. 4; and FIG. 6 is an enlarged view of a baffle near the outlet of the air stream.

Referring to FIGS. 1 and 2 the weather louver includes a housing 1 having a plurality of vanes 2 mounted therein to extend from the front 1A of the housing 1 to the rear 1B of the housing in a generally longitudinal direction indicated by the arrows 4 in FIG. 1. The vanes 2 each have a similar cross sectional configuration and include an inlet wall 2A, a diagonal wall 7, a connecting wall 13, and an outlet wall 2B. The vanes extend vertically in the housing 1 and are mounted therein in transversely spaced parallel relation relative to each other and to the longitudinal direction indicated by arrows 4. The respective walls 2A, 7, 13 and 2B of each vane combine with the corresponding walls of immediately adjacent vanes to define therebetween zigzag air stream passages 3 extending in the generally longitudinal direction, indicated arrows 4, through the weather louver.

Each air stream passage 3 includes, in the direction of flow of the air stream, an inlet portion 5 defined between the transversely spaced inlet walls 2A of adjacent vanes; a diagonal partition 6 defined between the transversely spaced diagonal walls 7 of adjacent vanes which extend at a first transverse angle away from the longitudinal direction 4; a connecting portion 12 defined between the transversely spaced connecting walls 13 of adjacent vanes which extend at a second transverse angle back toward said longitudinal direction 4; and an outlet portion 24 defined between the transversely spaced outlet walls 2B. Change of direction of the diagonal passage 6 places an impact surface 8 in position to be contacted by liquid particles carried in the air stream through the inlet passage 5. Due to the inertia of the particles which have a greater weight than the air molecules, the particles tend to precipitate on the impact surface 8 as will be more fully explained hereinafter. The diagonal and connecting walls extend at a right angle relative to each other. The juncture between the diagonal and connecting walls 7 and 13 is comprised of first and second arcuate parts 9A and 10A which, in cross section, may be circumferentially connected segments of a single circle which has a circumferential gap facing upstream into the diagonal portion 6 of the air stream passage 3 to define a dead air moisture collecting chamber 10.

With reference to any one common air flow passage 3 between two immediately adjacent vanes 2 the arcuate part 9A on one vane extends part way into one side of the common air stream passage and the arcuate part 9B of the immediately adjacent vane extends part way into the other side of the common air stream passage. The first and second arcuate parts 9A, 10A define, therebetween, a first venturi 9B which is at the juncture of the diagonal and connecting walls for accelerating the air stream and the liquid particles therein as the air stream changes direction when passing from the diagonal portion 6 into the connecting portion 12 of the air stream passage 3.

The second arcuate part 9A has an integral deflector 9, which may be arcuate in cross section, that extends upstream into said diagonal portion 6 of the air stream passage. The arcuate part 9A and the opposite adjacent diagonal wall 7 define therebetween a second venturi 9C upstream of the juncture of the diagonal and connecting walls 7 and 13 for accelerating the air stream and the liquid particles in passage 6 as it approaches the juncture between the diagonal wall 7 and connecting wall 13.

The deflector 9 extends transversely into the passage to narrow the width of the passage and forms a dead air chamber 10 under the deflector 9. The deflector 9 also obstructs a portion of the cross-sectional area of the passage to define the second venturi 9C which causes an acceleration of the air. The airstream passes through a short, wider area and then flows by the arcuate parts 9A and 10B defining the first venturi which again accelerates the air stream and the particles therein. This in turn causes the particles to impact against the corrugated surface 11 as the air makes a right angle turn going to the connecting passage 12.

The surface 14 of wall 13 has a vane 15 forming a collector for moisture precipitated on the surface upstream of the vane. The vane also accelerates flow of the air in turn causing a precipitation of moisture particles on the impact surface 16. A deflector 17 on the outlet wall 2B also operates as a collector to collect moisture from impact surface 16. The deflector 17 extends transversely of the passage forming a trough for draining fluid from the weather louver assembly.

The operation of the weather louver will be described in the following paragraphs.

The flow of air through the weather louver is induced by the fan 20. The air enters the inlet passage 5 at approximately a rate of flow of 1000 ft/min. Liquid particles are is entrained in the air and as the air changes direction upon entering the diagonal passage 7, the liquid particles impinge upon the impact surface 8. Movement of the air causes the liquid particles to flow toward the dead air chamber 10. As the liquid accumulates in the dead air chamber 10, it drains downwardly and is discharged from the weather louver assembly by a suitable drain passage not shown.

The deflector 9 extends part way into one side of the air stream of diagonal passage 7 and partially obstructs the flow of the air steam therein. Deflector 9 also forms the second venturi 9C as previously explained. Since the diagonal passage 6 is slightly smaller than the inlet passage 5, the rate of flow is higher and is approximately 1500 ft/min. Since the deflector 9 further obstructs the diagonal passage, the velocity of the air increases as it passes through the second venturi 9C. The rate of flow of the air around the deflector 9 is approximately 3000 ft/min. As the air passes by the deflector, it decreases to approximately 1765 ft/min. The air stream is again accelerated as it passes through the first venturi 9C and then the velocity decreases because connecting passage 12 is wider than the venturi 9C it makes a right angle turn by the serrated surface 11. The liquid particles are heavier than air molecules and thus have a greater tendancy to follow a path closer to a straight line. The liquid particles, when accelerated, will follow closer to a straight line and will not be able to turn from diagonal passage 6 into connecting passage 12 and thus will impact upon the corrugated impact surface 11. The rate of flow through the connecting passage 12 is approximately 1500 ft/min.

The air continues on through the connecting passage and passes around the vane 15 which extends into the connecting passage 12. At this point, the air velocity has again been accelerated to approximately 2000 ft/min. and the remaining particles of liquid are projected against the impact area 16. The air turns at approximately 45° at this point and exits from the outlet passage 24. Liquid particles impinging on the impact surface 16 are restrained from going beyond baffle 17 and are drained downwardly to a drain passage and are discharged from the weather louver assembly. The use of the linear passages and the changes in direction of the passage as it goes through the weather louver cause the liquid particles to precipitate against the surfaces as shown. The change in air velocity also affect the precipitation of the moisture and liquid particles as the air flows through the passage. Accordingly, the weather louver precipitates solid particles and liquid droplets because of inertia separation since the particles are heavier than the air stream and tend to continue in the direction of their movement. The air changes direction through the passage leaving the particles precipitated on the surfaces of the passage.

The embodiments of the invention in which an exclusive property or privilege is claimed are defined as follows:

1. In a weather louver for separating liquid particles from a flowing air stream as it passes through said weather louver from the front to the rear thereof in a generally longitudinal direction along a zigzag flow path, said weather louver having:

a housing;
  a plurality of vanes each including an inlet wall, a diagonal wall, a connecting wall, and an outlet wall, said vanes each having a similar cross sectional configuration and mounted in said housing in transverse spaced parallel relation to each other with said respective walls of immediately adjacent vanes defining therebetween a zigzag air stream passage extending in said longitudinal direction through said weather louver;
  said air stream passage including, in said longitudinal direction of flow of said air stream, an inlet portion defined by said spaced adjacent inlet walls, a diagonal portion defined by said spaced adjacent diagonal walls extending at a first transverse angle away from said longitudinal direction, a connecting portion defined by said spaced adjacent connecting walls extending at a second transverse angle back toward said longitudinal direction and an outlet portion defined by said spaced adjacent outlet walls;
  The improvement comprising;

a first arcuate part projecting part way into one side of said air stream passage at the juncture of said diagonal and connecting walls of one of said vanes;

a second arcuate part projecting part way into the other side of said air stream passage at the juncture of said diagonal and connecting walls of an immediately adjacent vane;

said first and second arcuate parts defining therebetween a first venturi at the juncture of said diagonal and connecting walls for accelerating the velocity of said liquid particles;

said second arcuate part having a deflector extending upstream into said diagonal portion of said air stream passage to define a second venturi upstream of said juncture of said diagonal and connecting walls for accelerating the velocity of said liquid particles;

said deflector and diagonal wall defining an opening for entry of liquid into said second arcuate part; and said connecting wall having an impact surface downstream from said first and second venturi against which said liquid particles impinge for collection and removal.

2. A weather louver according to claim 1 wherein said juncture between said diagonal wall and said connecting wall is constituted by first arcuate part.

3. A weather louver according to claim 1 wherein said first and second arcuate parts are circumferentially connected segments of a single circle.

* * * * *